INVENTOR.
MORTON R. SHAW
BY
ATTORNEY.

United States Patent Office 2,749,579
Patented June 12, 1956

2,749,579
DOUBLE-GLAZED CELLS

Morton R. Shaw, Corning, N. Y., assignor to Corning Glass Works, Corning, N. Y., a corporation of New York Application March 4, 1954, Serial No. 414,177

15 Claims. (Cl. 20—56.5)

The present invention relates to double-glazed cells or windows and has particular relation to the sealing of pores or vents employed for equalization of the pressures between the inside and the outside of such a cell or window.

A double-glazed window unit, which comprises two sheets of glass in spaced parallel relationship, is generally fabricated either by joining the glass sheets along their edges to a spacer of a metal or some other material or by fusing such sheets to each other along their edges as taught for example in Patent No. 2,389,360 to Edwin M. Guyer, Jesse T. Littleton and Morton R. Shaw, Jr. In the fabrication of such a unit in accordance with the latter procedure, the glass sheets are necessarily heated to a high temperature in order to effect the desired seal, with the result that the air between the glass sheets becomes highly heated and expands. To prevent collapse of the unit upon cooling to atmospheric temperature, it is necessary to provide a vent or pore in one of the sheets so that the pressures between the inside and the outside of the unit can be equalized.

As will be obvious, such vent or pore must be closed to prevent the entry of water vapor into the interior of the unit. While it would seem a relatively simple matter to close such a pore, such is actually not the case. Not only is it essential that such pore seal itself remain intact throughout the useful life of the window unit, but it is also necessary to effect such closure without damage to the glass sheet containing the vent or pore. The magnitude of this problem will be fully appreciated when it is realized that not only is it desirable to employ an opening as small as possible but that, if such opening is closed after the glass sheets have been sealed together, such closure must be effected without reheating the entire unit.

The primary object of the present invention accordingly is the provision of an improved system for readily and simply effecting closure of such a pore without damage to the double-glazed window unit itself.

A further object of the invention is the provision of such a double-glazed window unit embodying an improved pore opening or seal.

According to one form of embodiment of the invention, a sleeve comprising a re-entrant double-walled tube having its inner and outer walls joined at one end with such outer wall being provided with an outwardly extending flange at its outer end is inserted into the pore with such flange abutting the outer surface of the glass sheet. Bonding of the flange to the outer surface of the glass sheet containing the pore is effected by appropriate heating and fushion of a solder glass (a glass having a working point substantially lower than that of the glass from which the sheets are fabricated), which either can be precoated on the flange or on that portion of the outer surface of the glass sheet surrounding the opening or can be suitably positioned between the flange and the outer surface of the glass sheet during insertion of the tube into the opening. The tube or sleeve may be composed either of a metal or a glass, the thermal expansion coefficient thereof advantageously closely matching that of the glass sheets as well as that of the solder glass. Final closure of the pore may be accomplished by means of either a metallic solder if the double-walled tube is composed of a metal or a glass solder, a bead of which may be positioned on the outer end of the inner wall of the double-walled tube and suitably heated until it fuses to such tubular wall; or final closure can be effected by tipping off the outer end of such inner wall as by use of a flame if such double-walled tube is composed of a glass or by pinching and welding such outer end if the tube is composed of a metal.

In another form of embodiment of the invention, at least the outer end of the outer wall of the double-walled tube is outwardly flared, and the pore is provided with an inwardly tapering surface for engagement by such flare. Bonding of the flare to the tapered surface of the pore and final closure of the pore are effected in manners similar to those described above.

For a better understanding of the invention, reference is made to the accompanying drawing wherein.

Figure 1:
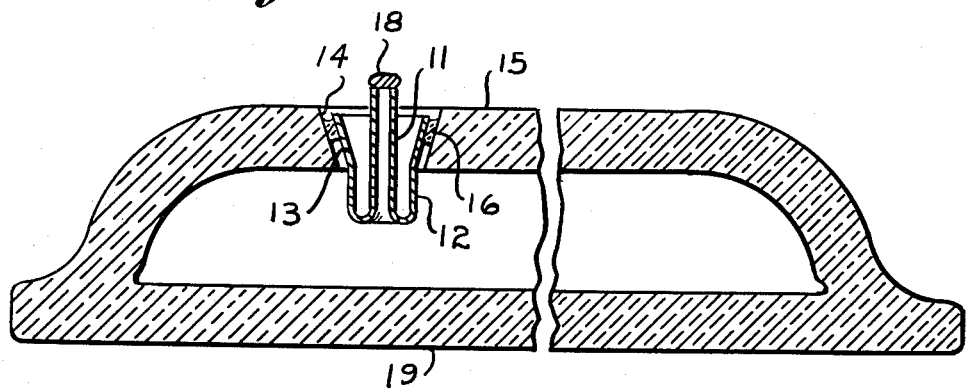
Fig. 1 is a sectional elevation of a double-glazed window unit embodying one form of a pore seal assembly according to the present invention.

The construction illustrated in Fig. 1 includes a metal sleeve comprising a re-entrant double-walled tube whose inner wall 11 and outer wall 12 are joined at their inner ends, the outer portion 13 of such outer wall being outwardly flared. As indicated, the double-walled tube is inserted in the aperture 14 provided in sheet 15 of the double-glazed unit, such aperture tapering outwardly toward the outer surface of such sheet to match the flared portion of tubular wall 12; and such flared portion 13 is bonded to the tapered surface of the aperture by means of a suitable solder glass 16, which may be appropriately interposed therebetween and suitably heated to effect its fusion.

To effect closure of the inner wall of the double-walled tube, a bead 18 of a metallic solder is positioned at its outer end and heated to cause it to soften and fuse to such wall. Alternatively, the outer end of such inner wall can be pinched or flattened and then welded or soldered to provide the desired seal. To avoid any excessive overheating of the solder glass seal 16, the double-walled tube may project into the space between glass sheets 15 and 19 as illustrated.

Figure 2:
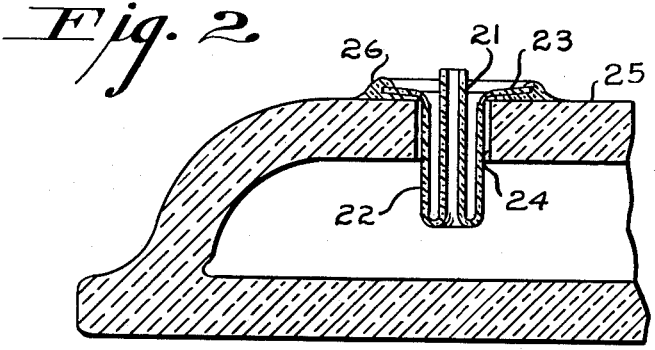
Fig. 2 is a sectional fragmental view showing an alternative form of the pore seal assembly illustrated in Fig. 1.

In the structure shown in Fig. 2, the aperture 24 is uniform in cross-section; and the outer wall 22 of the re-entrant double-walled tube inserted therein is straight and is provided with an outwardly extending flange 23 at its outer end. Bonding of such flange to the outer surface of sheet 25 is effected by means of the solder glass seal 26. As shown, the double-walled tube may be composed of a glass, in which case closure of its inner wall 21 can be effected by tipping-off its outer end as in usual lamp-working practice.

Figures 3, 4:
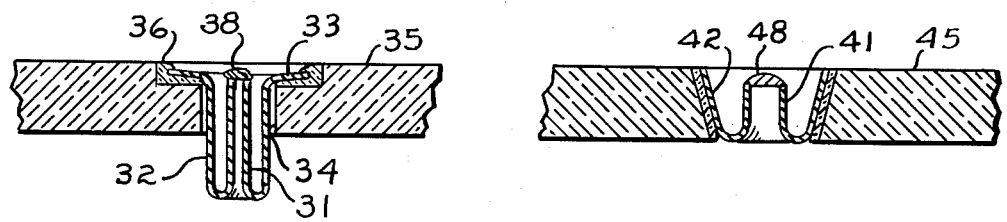
Fig. 3 is a sectional fragmental view showing an alternative form of the pore seal assembly illustrated in Fig. 2.
Fig. 4 is a sectional fragmental view showing an alternative form of the pore seal assembly illustrated in Fig. 1.

It may be undesirable in some instances to have any portion of the seal assembly project above the outer surface of the window. Figs. 3 and 4 show alternative arrangements for avoiding this objection. In the structure of Fig. 3 the exterior surface of sheet 35 immediately surrounding aperture 34 is recessed to a depth sufficient to accommodate the flange 33 of the outer wall 32 of the double-walled tube, and the solder glass seal 36 is thus made at a level below such exterior surface. As shown, the outer end of the inner wall 31 of the double-walled tube terminates at the level of flange 33 so that the metallic solder seal 38 thereof does not project above sheet 35. In the structure of Fig. 4 the outer end of the inner wall 41 of the double-walled tube terminates below the outer end of the outer wall 42 thereof so that the metallic solder seal 43 of the outer end of such inner wall is below the outer surface of sheet 45. As shown in Fig. 4, the double-walled tube need not project into the space between the glass sheets of the double-glazed unit; and, as shown in Figs. 1 and 4, where the aperture in the glass sheet is tapered, such tapering advantageously extends throughout the entire thickness of such sheet.

Where the double-walled tube is composed of a metal as in the structures of Figs. 1, 3 and 4, the outer end of the inner wall may alternatively be closed off by positioning a bead of a suitable solder glass thereon and heating such tube as by high-frequency induction heating to soften the bead by conduction and cause it to fuse to such wall. It will be appreciated that, where the tube is composed of a glass, induction heating can also be employed by suitably associating a metal with the solder glass bead. Where the double-walled tube is composed of a glass as in the structure of Fig. 2, the outer end of the inner wall may alternatively be closed off by fusing a solder glass bead positioned thereon as by means of high-frequency dielectric-loss heating, in which case a suitable high dielectric-loss material such as manganese dioxide may be appropriately intermingled with the solder glass or otherwise associated therewith, it being understood that such material is heated and thereby heats the solder glass by conduction. Any other suitable similar sealing medium may also be employed for the purpose.

It is also to be understood that, while the closure assembly is conveniently effected in its entirety after the double-glazed unit has been fabricated, the sleeve may be inserted in the pore opening prior to sealing of the glass sheets together and then bonded to the glass sheet surrounding the opening during such sealing operation. It will be further appreciated that the present invention also finds utility in sealing openings in other types of hollow glass bodies.

What is claimed is:

1. A hollow glass body having an opening thereinto through a wall thereof, and a closure for such opening comprising a sleeve inserted therein, said sleeve comprising a re-entrant double-walled tube having its inner and outer walls joined at one end, the outer wall of said tube being secured to the body wall by a vitreous bond of a solder glass, the inner wall of said tube being closed off to establish a seal between the body cavity and the external atmosphere.

2. A hollow glass body having an opening thereinto through a wall thereof, and a closure for such opening comprising a sleeve inserted therein, said sleeve comprising a re-entrant double-walled tube having its inner and outer walls joined at their inner ends, the outer wall of said tube extending outwardly over at least the outer portion of its length, said outwardly extending portion being secured to the body wall by a vitreous bond of a solder glass, the inner wall of said tube being closed off at its outer end to establish a seal between the body cavity and the external atmosphere.

3. A structure such as defined by claim 2, in which the sleeve, the solder glass, and the glass body are all closely matching in thermal expansion coefficient.

4. A structure such as defined by claim 3 in which the sleeve is composed of a metal.

5. A structure such as defined by claim 3 in which the sleeve is composed of a glass.

6. A hollow glass body having an opening thereinto through a wall thereof, said opening tapering outwardly toward the outer surface of said body wall, and a closure for such opening comprising a sleeve inserted therein, said sleeve comprising a re-entrant double-walled tube having its inner and outer walls joined at their inner ends, the outer wall of said tube being outwardly flared over at least the outer portion of its length, said flared portion being secured to the outwardly tapering surface of said opening by a vitreous bond of a solder glass, the inner wall of said tube being closed off at its outer end to establish a seal between the body cavity and the external atmosphere.

7. A structure such as defined by claim 6, in which the length of the outer wall of the double-walled tube is substantially the same as the thickness of the body wall and such outer wall is outwardly flared throughout substantially its entire length.

8. A structure such as defined by claim 6, in which the inner wall of the double-walled tube is shorter in length than the outer wall thereof.

9. A structure such as defined by claim 6 in which the double-walled tube is composed of a metal and the inner wall of said tube is closed off at its outer end by a seal formed from a metallic solder.

10. A hollow glass body having an opening thereinto through a wall thereof, and a closure for such opening comprising a sleeve inserted therein, said sleeve comprising a re-entrant double-walled tube having its inner and outer walls joined at their inner ends, the outer wall of said tube having an outwardly extending flange at its outer end, said flange being secured to that portion of the outer surface of the body wall surrounding the opening by a vitreous bond of a solder glass, the inner wall of said tube being closed off at its outer end to establish a seal between the body cavity and the external atmosphere.

11. A structure such as defined by claim 10 in which the portion of the outer surface of the body wall surrounding the opening is recessed and the flange is secured to such recessed portion.

12. A structure such as defined by claim 10 in which the double-walled tube is composed of a metal and the inner wall of said tube is closed off at its outer end by a seal formed from a metallic solder.

13. A double-glazed window unit comprising a pair of glass plates disposed in spaced parallel relation and sealed to each other along their edges, one of said glass plates having an opening therethrough, and a closure for such opening comprising a sleeve inserted therein, said sleeve comprising a re-entrant double-walled tube having its inner and outer walls joined at one end, the outer wall of said tube being secured to the glass plate by a vitreous bond of a solder glass, the inner wall of said tube being closed off to establish a seal between the space between the glass plates and the external atmosphere.

14. A double-glazed window unit comprising a pair of glass plates disposed in spaced parallel relation and sealed to each other along their edges, one of said glass plates having an opening therethrough, and a closure for such opening comprising a sleeve inserted therein, said sleeve comprising a reentrant double-walled tube having its inner and outer walls joined at their inner ends, the outer wall of said tube extending outwardly over at least the outer portion of its length, said portion being secured to the glass plate by a vitreous bond of a solder glass, the inner wall of said tube being closed off at its outer end to establish a seal between the space between the glass plates and the external atmosphere.

15. In a double glazed unit having a pore opening formed in a wall thereof, a closure structure for the opening comprising a reentrant, external glass capillary tube in the opening, one end of the tube being integrally connected to the walls of the pore opening and the other end of the tube being sealed.

References Cited in the file of this patent

UNITED STATES PATENTS

| | | |
|---|---|---|
| 2,389,360 | Guyer | Nov. 20, 1945 |
| 2,683,906 | Nevins | July 20, 1954 |
| 2,686,342 | D'Eustachio | Aug. 17, 1954 |